United States Patent [19]

Land

[11] 4,165,153
[45] Aug. 21, 1979

[54] TRANSLUCENT SCREEN

[75] Inventor: Edwin H. Land, Cambridge, Mass.

[73] Assignee: Polaroid Corporation, Cambridge, Mass.

[21] Appl. No.: 899,792

[22] Filed: Apr. 25, 1978

[51] Int. Cl.² .......................................... G03B 21/60
[52] U.S. Cl. ............................................... 350/126
[58] Field of Search ..................................... 350/126

[56] References Cited

U.S. PATENT DOCUMENTS

| | | | |
|---|---|---|---|
| 1,204,401 | 11/1916 | Brixey | 350/126 X |
| 2,287,556 | 6/1942 | Land | 350/126 |
| 3,655,262 | 4/1972 | De Palma | 350/126 |
| 3,712,707 | 1/1973 | Henkes, Jr. | 350/126 X |
| 3,726,583 | 4/1973 | Fujisaki et al. | 350/126 |
| 3,751,135 | 8/1973 | Clausen et al. | 350/126 X |
| 4,066,332 | 1/1978 | Kato et al. | 350/126 |

Primary Examiner—Richard A. Wintercorn
Attorney, Agent, or Firm—Stanley H. Mervis

[57] ABSTRACT

Translucent screens are provided comprising a dispersion of low index of refraction particles dispersed in a continuous polymeric phase of a higher index of refraction material.

15 Claims, 1 Drawing Figure

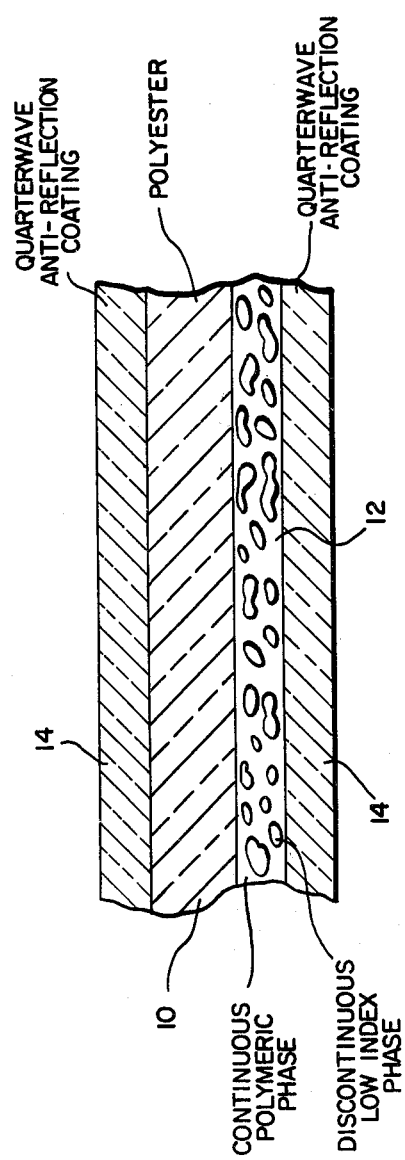

TRANSLUCENT SCREEN

This invention relates to new and improved translucent screens.

An object of this invention is to provide a translucent screen showing little or no scintillation, having substantially no grain, showing substantially no hot spot or area of excessive brilliance, and diffusing the transmitted light over a wide area.

Further objects of this invention are to provide a translucent screen composed of particles of a material having a low index of refraction dispersed in a polymeric binder having a higher index of refraction, and to provide self-supporting translucent screens of this character.

Other objects of this invention will in part be obvious and will in part appear hereinafter.

The invention accordingly comprises the several steps and the relation of one or more of such steps with respect to each other of the others, and the article possessing the features, properties, and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing in which:

The FIGURE represents diagrammatically and in exaggerated cross-sectional view a translucent screen embodying this invention.

U.S. Pat. Nos. 2,180,113 issued Nov. 14, 1939, and 2,287,556 issued June 23, 1942, both in the name of Edwin H. Land, describe translucent screens comprising one transparent medium forming a continuous phase and a second transparent medium in the form of minute, substantially colorless, discrete particles distributed throughout said first medium as a discontinuous phase, each medium having an index of refraction greater than that of air, the difference between the indices of refraction of said first and second media being small, said particles having non-planar and non-parallel surfaces and an overall diameter greater than one micron, whereby the ratio of refracted to reflected light at the interfaces between said media is high. As described in said U.S. Pat. No. 2,287,556, a particularly effective translucent screen comprises particles or globules of benzyl cellulose in ethyl cellulose. Benzyl cellulose is not commercially available, and it is highly desirable to provide a translucent screen of similar or superior properties.

My copending application, Ser. No. 884,706 filed Mar. 8, 1978, discloses and claims a translucent screen composed of starch particles, preferably rice starch particles, dispersed in a film of an organic polymer of appropriate index of refraction. In the preferred embodiment, the rice starch and the polymer differ in index by about 0.04.

It has now been found that highly efficient translucent screens may be obtained by forming a dispersion of low index particles in a solution of an organic polymer of a higher index of refraction, and forming a film from this dispersion. The low index particles preferably are polymeric and should have a diameter not greater than about 5 microns. A particularly useful low index material is polytetrafluoroethylene having a diameter of about 1 to 2 microns, and exhibit a "flattened" or platelet-like configuration.

The polymeric dispersion of low index particles may be in the form of a film or a sheet of any desired thickness, for example, from 0.002 to 0.004 inch or thicker. Such a film may be self-supporting, or it may have a supporting sheet of glass or plastic on either or both sides. The film may be formed by casting, extruding, flowing, pouring, or spraying a solution of the polymer containing the dispersed low index particles. One preferred method of forming the film is to cast the dispersion upon a glass or other flat surface. Upon evaporation of the solvent, the desired dispersion of particles in polymer is produced. When dry, the film may be stripped from the surface upon which it was cast.

There is illustrated in the FIGURE a preferred embodiment of the present invention. As shown, a polyester film 10 carries on one surface a translucent layer (screen) 12 comprising a discontinuous low index phrase in a higher index, continuous polymeric phase. A quaterwave antireflection coating 14 is coated on the other surface of the polyester film 10 and on the outer surface of the translucent layer 12. In use, it is preferred to have the polyester layer 12 positioned towards the projector, with the translucent layer 12 thus positioned towards the viewer.

As examples of suitable continuous phase polymers, mention may be made of ethyl cellulose, cellulose acetate, polymethyl methacrylate, the half-butyl ester of poly(ethylene/maleic anhydride), polyvinyl butyral, and similar polymers. This polymer preferably has an index of refraction of at least 0.1 greater than the discontinuous phase.

The following examples of the preparation of translucent screens in accordance with this invention are given for purposes of illustration and are not intended to be limiting.

EXAMPLE 1

A translucent screen was prepared by mixing 3 g. of polytetrafluoroethylene powder (Fluon L-171 commercially available from ICI Americas, Inc., Petrochemicals Division, Wilmington, Delaware) with 10 g. of ethyl cellulose (Dow Chemical Co., 100 centipoise), and adding this mixture, with stirring, to a hot mixture of 60 cc. of toluene and 40 cc. of ethyl alcohol 2B. (It is not necessary that the solvent mixture be hot, but the use of heat increases the rate at which the ethyl cellulose dissolves). 0.195 g of Ivory Black (amorphous bone carbon ground in highly purified linseed oil, and commercially available from M. Grumbacker, Inc., New York, New York, under catalog no. P115) was also added. A layer 0.035 inch thick of this dispersion was cast on a glass plate, using an 8-inch doctor blade. The solvents were evaporated off to give a milky white, translucent film having a thickness of about 0.0035 inch. This film was stripped off the glass plate to provide a self-supporting film.

EXAMPLE 2

16 g. of Fluon L-171 polytetrafluoroethylene and 0.25 g. of Grumbacker Ivory Black were dispersed in 100 g. of a solution comprising:

Half-butyl ester of poly(ethylene/maleic anhydride): 180 g.
Polyvinyl butyral (Butvar): 20 g.
Ethyl acetate: 290 g.
n-butanol: 170 g.

Methyl ethyl ketone: 540 g.
and the resulting dispersion was coated on 4 mil transparent polyethylene terephthalate film base to provide a dry thickness of about 0.0017 inch. An anti-reflection coating comprising an approximate 2:1 by weight mixture of Kynar 7201 (tradename of Pennwalt Chemical Co. for a copolymer of vinylidene fluoride and tetraflurorethylene) and polymethyl methacrylate was coated from methyl propyl ketone on the translucent layer, a similar anti-reflection coating already being present on the other side of the polyethylene terephthalate film base. (The anti-reflection coatings each had an optical thickness of about 1400 Angstroms, and were applied in accordance with the teachings of U.S. Pat. No. 4,066,814.) Examination of the resulting translucent screen showed that it transmitted the following percentages of light projected on one surface thereof:
White: 76%
Red: 78%
Green: 76%
Blue: 72%

EXAMPLE 3

The procedure described in Example 2 was repeated except that the Fluon L-171 content was increased to 20 g., and the dispersion was coated at a thickness of 0.006 inch to give a dry thickness of approximately 0.0008 inch. Examination of the resulting translucent screen showed that it transmitted the following percentages of light projected on one surface thereof:
White: 78%
Red: 79%
Green: 78%
Blue: 78%

The translucent screens prepared in the above examples were used as the projection screen in a rear projection viewer of the general type shown in U.S. Pat. No. 3,851,954 issued Dec. 3, 1974. Very even illumination without hot spots was obtained, and the projected image was brilliant without loss of color saturation in a high ambient light-viewing situation. In addition, a high-quality projected image was viewable with very little if any loss of quality over a very wide viewing angle, both horizontal and vertical.

When placed between a light polarizer and a rotatable analyzer, the translucent screens prepared in the above examples were found to depolarize light. In contrast, the translucent screens of the above-noted patents, e.g., benzyl cellulose dispersed in ethyl cellulose, exhibit substantially no depolarization of light.

The concentration of the low index particles may vary over a considerable range, provided the translucent screen is substantially uniform to eliminate hot spots in viewing. If a thicker screen is made, the low index particle concentration may be reduced to obtain a similar translucency. Accordingly, the appropriate concentration of low index particles may be readily determined for a particular projection intensity.

It is within the scope of this invention to form the translucent screen with one or both surfaces being nonplanar. Thus, a translucent Fresnel lens of the general type shown in the rear projection screens described in U.S. Pat. No. 3,740,127 issued June 19, 1973 to Phillip G. Baker, Stewart Bennett and Richard W. Young and in U.S. Pat. No. 3,848,980 issued Nov. 19, 1974 to William T. Plummer, may be prepared by molding polymethyl methacrylate having the above-described polytetrafluoroethylene particles dispersed therein.

The particular polymer employed for the continuous phase is selected to satisfy the particular hardness, flexibility, etc., requirements of the intended use. The index difference between the low index particles and the polymer preferably is at least about 0.1. Satisfactory screens can be made with greater index differences, providing the concentration of low index particles per unit area is decreased with increased differences in index. In the preferred embodiments illustrated above, the polytetrafluoroethylene has an index of refraction of about 1.35, the film of the half-butyl ester of poly(ethylene/maleic anhydride) and polyvinyl butyral had an index of refraction of about 1.48, and ethyl cellulose has an index of refraction of about 1.49.

In one embodiment of the invention, the translucent screen includes a very small quantity of a neutral light-absorbing material such as carbon black or a neutral mixture of dyes. The presence of this light-absorbing material will greatly reduce sideways loss of contrast, by scattered light, of the image projected on the screen with essentially negligible tinting of the white screen.

In Examples 2 and 3, the polyethylene terephthalate film base had a thickness of about 4 mils. It will be understood that thicker film bases, e.g., 10 mils, also may be used. Translucent screens of the type described in Examples 2 and 3 have been coated in long lengths, e.g., 1000 feet, and rolled without damage to the screen.

Since certain changes may be made in the above products and processes without departing from the scope of the invention herein involved, it is intended that all matter contained in the above description shall be interpreted as illustrative and not in a limiting sense.

What is claimed is:

1. A translucent screen comprising a dispersion of particles as a discontinuous phase in a polymeric continuous phase, said continuous phase having a higher index of refraction than said particles, said particles and said continuous phase having indices of refraction differing by at least 0.10, said particles having nonplanar surfaces and having overall diameters not exceeding about 5 microns.

2. A translucent screen as defined in claim 1 wherein said particles are polytetrafluoroethylene particles.

3. A translucent screen as defined in claim 2 wherein said polytetrafluoroethylene particles have a diameter of about 1 to 2 microns and are flake-like in configuration.

4. A translucent screen as defined in claim 1 wherein said polymeric continuous phase comprises a half-butyl ester of poly(ethylene/maleic anhydride).

5. A translucent screen as defined in claim 1 wherein said polymeric continuous phase comprises polyvinyl butyral.

6. A translucent screen as defined in claim 1 wherein said polymeric continuous phase is ethyl cellulose.

7. A translucent screen as defined in claim 1 wherein said particles are polytetrafluoroethylene particles having a diameter of about 1 to 2 microns and said polymeric continuous phase comprises a half-butyl ester of poly(ethylene/maleic anhydride).

8. A translucent screen as defined in claim 1 wherein the surfaces of said screen are substantially flat and parallel.

9. A translucent screen as defined in claim 8 wherein at least one of said surfaces carries an anti-reflection coating.

10. A translucent screen as defined in claim 9 having the configuration of a Fresnel lens.

11. A translucent screen as defined in claim 1 including a small quantity of a light-absorbing material.

12. A translucent screen as defined in claim 11 wherein said light-absorbing material is carbon black.

13. A translucent screen as defined in claim 1 wherein said dispersion is carried by a transparent support.

14. A translucent screen as defined in claim 13 wherein the other surface of said transparent support carries an anti-reflection coating.

15. A translucent screen as defined in claim 14 wherein said transparent support is a polyester.

* * * * *